United States Patent [19]

Allen

[11] Patent Number: 4,478,696
[45] Date of Patent: Oct. 23, 1984

[54] IONIZABLE REDUCING AND OXIDIZING GASEOUS SUPPLY MEANS AND PROCESS FOR CATALYTIC BARRIERS AND ELECTRODES

[75] Inventor: Robert J. Allen, Saugus, Mass.

[73] Assignee: Prototech Company, Newton Highlands, Mass.

[21] Appl. No.: 400,254

[22] Filed: Jul. 21, 1982

[51] Int. Cl.³ .......................... C25C 1/12; C25C 1/20
[52] U.S. Cl. .............................. 204/105 R; 204/106; 204/107; 204/108; 204/109; 204/265; 429/40; 429/41; 429/42
[58] Field of Search .................................. 204/106–109, 204/105 R, 265, 258, 256; 429/40–42

[56] References Cited

U.S. PATENT DOCUMENTS

| | | | |
|---|---|---|---|
| 3,103,473 | 9/1963 | Juda | 204/86 |
| 3,124,520 | 3/1964 | Juda | 204/86 |
| 4,044,193 | 8/1977 | Petrow et al. | 429/40 |
| 4,166,143 | 8/1979 | Petrow et al. | 427/115 |
| 4,293,396 | 10/1981 | Allen et al. | 204/106 |
| 4,331,520 | 5/1982 | Juda et al. | 204/105 |
| 4,331,524 | 5/1982 | Matthes | 204/129 |
| 4,385,970 | 5/1983 | Skopp et al. | 204/108 |

Primary Examiner—R. L. Andrews
Attorney, Agent, or Firm—Rines and Rines Shapiro and Shapiro

[57] ABSTRACT

This disclosure is concerned with the application of reducing or oxidizing gases, for use in electrochemical cells and the like embodying catalytic electrodes or barriers, at edge regions of such electrodes or barriers external to the cell electrolyte and the portions of electrodes or barriers contacting the electrolyte.

11 Claims, 4 Drawing Figures

IONIZABLE REDUCING AND OXIDIZING GASEOUS SUPPLY MEANS AND PROCESS FOR CATALYTIC BARRIERS AND ELECTRODES

The present invention is concerned with electrochemical and related cells embodying gas-catalytic electrodes or gas-catalytic barriers, including metal recovery cells, fuel cells and other electrochemical cells known in the art.

Exemplary of fuel cell and the like electrodes are, for example, those described in U.S. Pat. No. 4,044,193 of common assignee of the present application and exemplary of hydrogen-reduction metal recovery cells are those described in U.S. Pat. No. 4,331,520, again of the said common assignee.

As will herein after be explained, the invention appears to have utility with ionizable reducing (e.g. hydrogen) and oxidizing (e.g. oxygen-air), gases in a wide variety of electrochemical cell structures, but it is particularly advantageous as a startling improvement in electrochemical cells used for recovering hydrogen-reduced metals and ions and the like at porous catalytic barriers as described in the said U.S. Pat. No. 4,331,520. That patent will therefore be used to described one of the preferred hydrogen-reducing embodiments of the invention, though other specific applications and experiments in other types of cells, including the use of oxidants, will also be presented.

As described in said U.S. Pat. No. 4,331,520, the recovery of a hydrogen-reduced metal and/or ion from a metal ion aqueous electrolyte solution thereof is effected on a porous hydrophobic catalytic barrier without external electrical circuit, when the barrier is contacted with said solution and with hydrogen gas. Alternately, as described in co-pending application Ser. No. 387,963 filed June 14, 1982, such recovery is carried out by flowing the solution and the hydrogen gas, in "mixed phase" transversely through said barrier. In these uses and in the use of hydrogen and/or oxygen (air) in fuel and similar cells, the art has considered that the hydrogen and/or oxygen (air) should be directed along at least one of the surfaces of the catalytic barrier or electrode to permeate therethrough and effect the desired reaction. Highly refined gas feed structures have been evolved in the art to enable this type of application of the hydrogen or other gas.

In accordance with an unexpected discovery underlining the present invention, however, it has been found that excellent results can be obtained when the hydrogen gas or the like is applied to an exposed edge or rim area external to the cell electrolyte instead of being applied to one or both surfaces of the catalytic barrier or (electrode) within the cell.

While the mechanism for the surprising operation of this technique is not fully understood and it is not desired to predicate the invention upon any particular theory, it being sufficient to describe the steps and apparatus necessary to get the results of the invention, it appears that unexpectedly the hydrogen or other gas migrates from the region of the external edge or rim of the barrier or electrode into the cell, perhaps along catalyst sites, causing the same reduction reaction on the barrier or electrode as that produced when hydrogen is actually introduced in separate or mixed phase to the faces of the barrier or electrode within the cell.

An object of the present invention, accordingly, is to provide a new and improved process for applying ionizable reducing and oxidizing gases to catalytic barriers and electrodes in a wide variety of electrochemical cells, thereby greatly simplifying the construction and operation of the conventional types of feed systems. In particular, the process of the invention makes is possible to use open cell structures with ready accessibility for insertion and removal of catalytic electrodes or barriers provided only with edge hydrogen (or other active gas) supply means.

A further object particularly directed to the recovery by hydrogen reduction of $H_2$-catalytic noble metals, e.g. Pt and Pd, resides in the fact that the invention has been found to restrict the deposition of such catalytic noble metals to the confined barrier region of the cell, as distinguished from the scattered deposition thereof that occurs in the mixed phase system of the said co-pending application. This feature is extremely important when it is desired to take advantage of the rapid reduction rate of the flow-through operation of the said co-pending application and to localize the noble metal deposition on the barrier.

Other and further objects will be explained hereinafter and are more particularly delineated in the appended claims.

In summary, from one of its broad viewpoints, the invention embraces a process for introducing ionizable reducing and/or oxidizing gases into a catalytic electrode or barrier of an electrochemical cell and the like containing an electrolyte solution, the process comprising introducing the catalytic electrode or barrier into the electrolyte with an edge external thereto, and flowing the gas along that edge. In the specific application to cells utilizing catalytic barriers for the recovery, by hydrogen reduction, of metals and metal ions, the process involves introducing the catalytic barrier into the electrolyte again with an edge external thereto and flowing the hydrogen gas along that edge. The hydrogen gas supplied to the edge or rim external to the electrolyte within the cell has been found, in the case of metal recovery, to induce hydrogen reduction and deposition of the metal over the entire area of the barrier exposed to the electrolyte, several inches away from the edge, thus providing the above discussed advantages. The invention has also been found useful for the introduction of gaseous oxygen (or air) into an electrochemical cell having an electrolyte adapted to interact with a catalytic oxygen (air) electrode under a DC current passing through said cell; here, again, the catalytic electrode is introduced into the electrolyte with an edge external thereto and the gaseous oxygen (air) is flowed along that edge. Preferred embodiments and best mode forms of the invention are hereinafter presented.

The invention will now be described in connection with accompanying drawing

FIG. 1 of which illustrates a diagrammatic longitudinal sectional view of an apparatus constructed to enable hydrogen reduction in a cell operating without external circuitry as described in said co-pending application;

Figure 1:
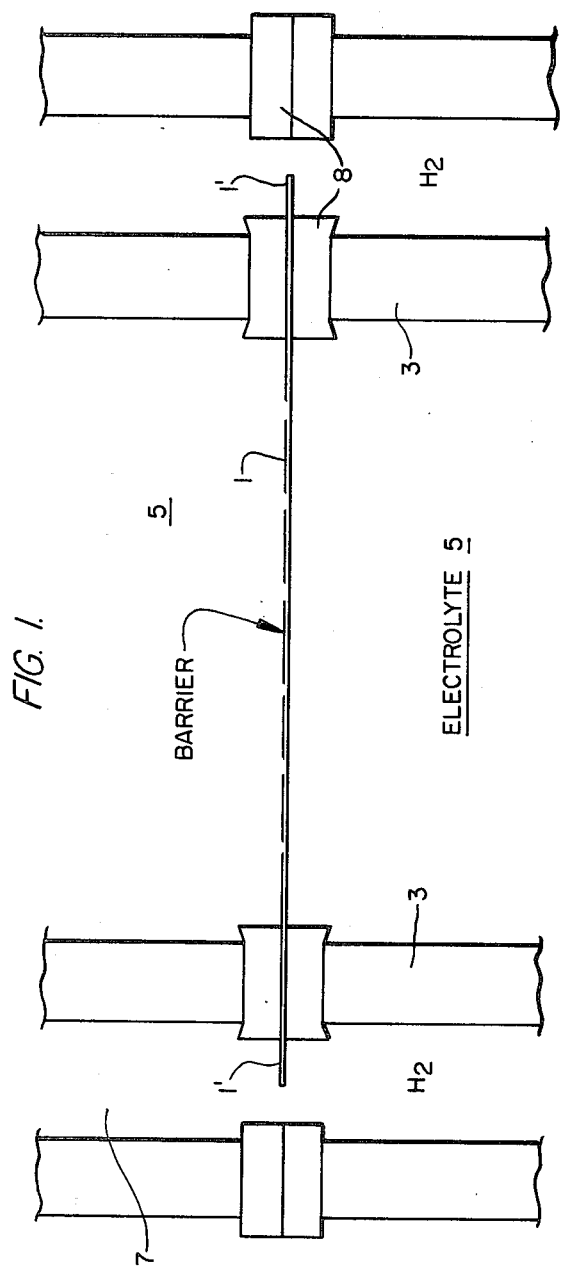

Referring to FIG. 1, for illustrative purposes, the invention is described as applied to a cell component as of the hydrogen-reducing type described in said U.S. Pat. No. 4,331,520 and co-pending application, containing a catalytic barrier 1 of gas permeable material prepared, for example, as described in Example 2 thereof is shown clamped in compression between cylindrical surfaces of the housing 3, containing the aqueous electrolyte solution 5. It is apparent that the thickness of the gas permeable material is small relative to its other dimensions. As illustrated, the external rim portion or peripheral edge of the catalytic barrier 1 is shown extending externally at 1' to the sealed cell housing within the cylinder container 3 in a tubular concentric chamber 7, rubber sealing gaskets being shown at 8. In accordance with the invention, it is through this chamber 7, isolated from the electrolyte 5, that the hydrogen gas ($H_2$) is applied externally to the actual cell structure, being flowed by the external edge 1' of the catalytic barrier 1. The gas then diffuses in the gas permeable material from the rim portion 1' to the main portion in the electrolyte along paths that are perpendicular to the thickness of the material. Through this construction the novel result of improved hydrogen reduction of the metal on the barrier 1 is produced; namely, the deposition of the noble metal or the like on the catalytic barrier 1 is confined to the internal portion of the barrier in contact with the electrolyte solution of the cell. Here, excellent hydrogen management and economy is attained by practically eliminating excess hydrogen dissolution in the electrolyte, as well as confining even $H_2$-catalytic metal deposition, when present in the electrolyte, to the interior barrier portion, in contrast to the said operation of the systems of said U.S. Pat. No. 4,331,520 and co-pending application.

Figure 2:
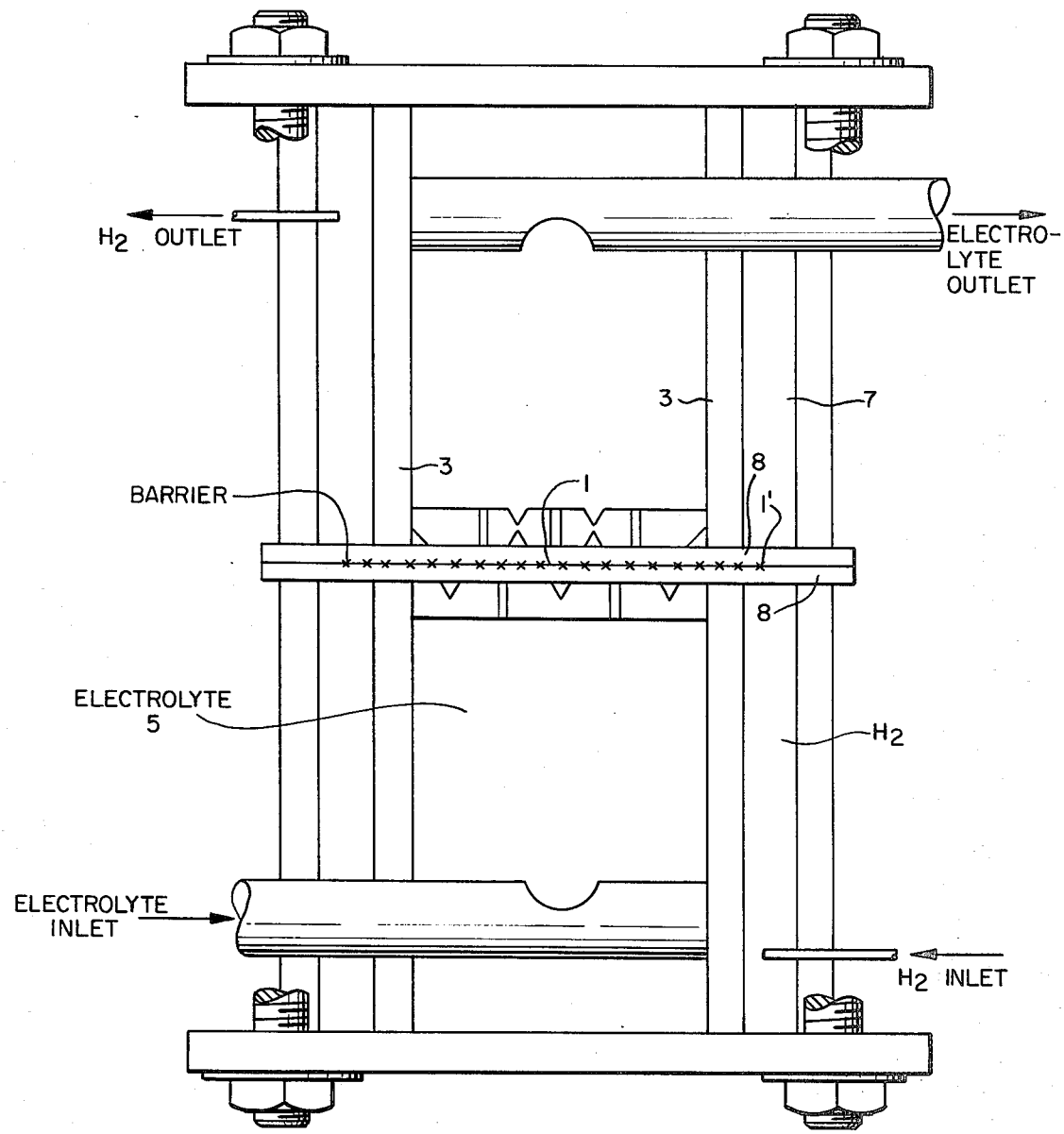
FIG. 2 is a more complete diagrammatic longitudinal section of a flow-through cell with edge hydrogen feed in accordance with the invention.

The system of FIG. 2 shows the complete unit comprising the component shown in FIG. 1 with the outlets and inlets for the electrolyte and outlets and inlets for the hydrogen gas labeled at the appropriate points.

Figure 3:
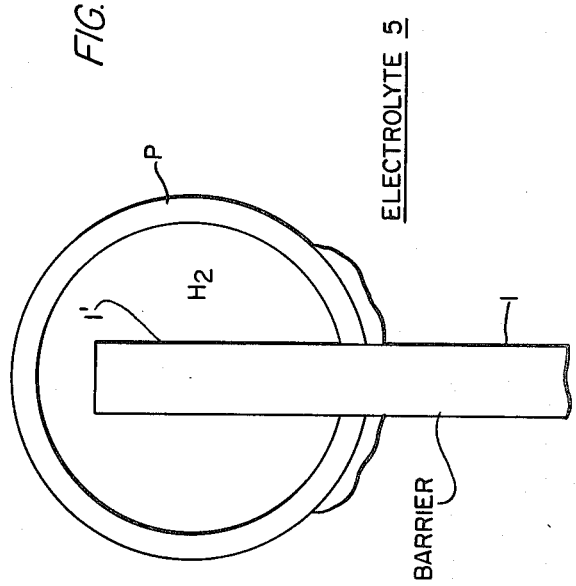
FIG. 3 is an expanded view of the barrier edge with the hydrogen feed along the rim.

FIG. 3 shows an expanded scale detail of the barrier 1 with the edge area 1' inserted and sealed, as by GE Silicone Seal or other well known sealant, into a pipe P serving as $H_2$-feed.

Figure 4:
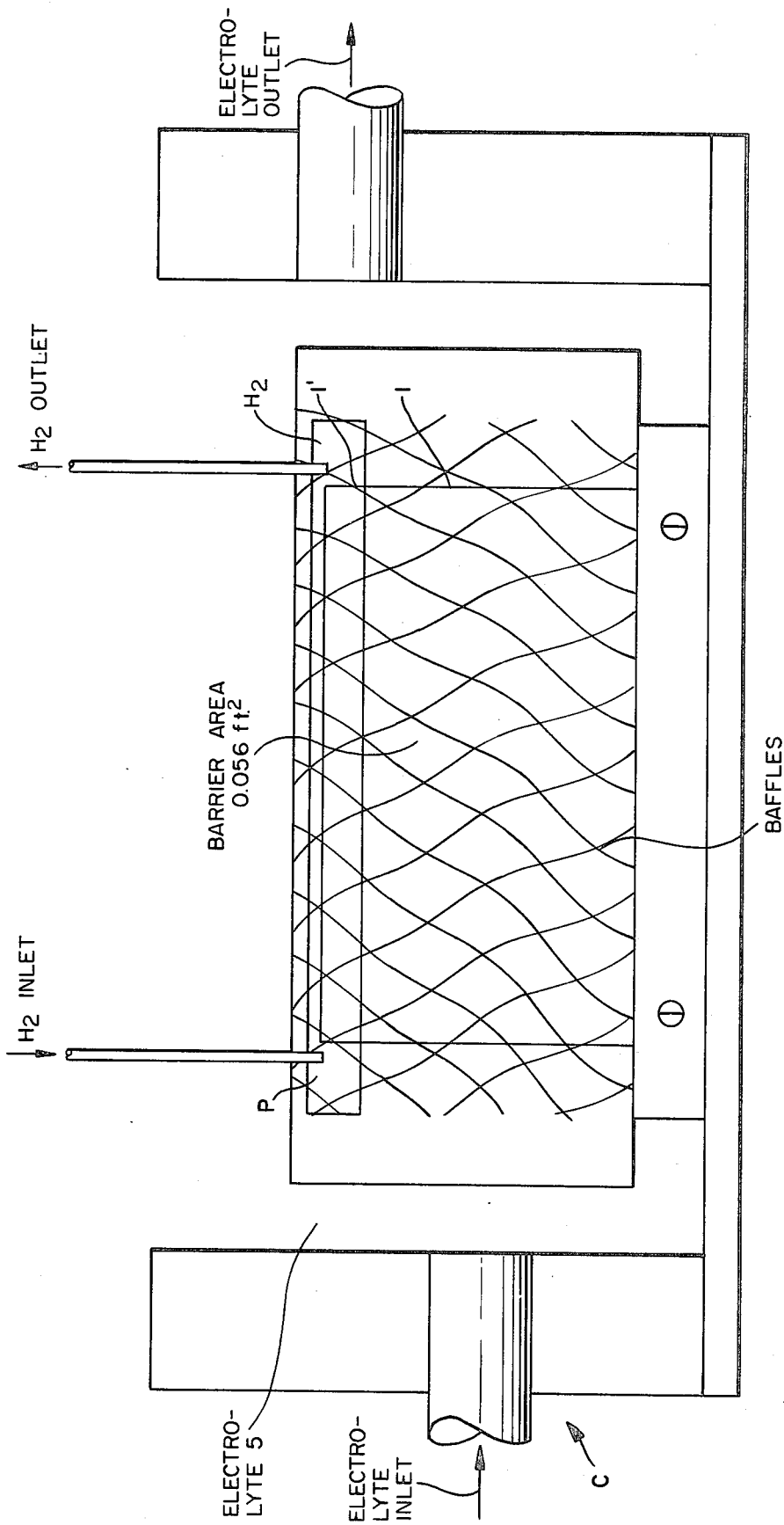
FIG. 4 is a diagrammatic view illustrating an edge hydrogen feed "flow-by" open cell, in which the solution is flowed by both faces of the barrier.

FIG. 4 shows the application of the invention to an open tank cell where the solution 5 is flowed by both sides of barrier 1 by means of baffles (so designated) with hydrogen feed pipes P of the type illustrated in FIG. 3 and with the system enabling the withdrawal of the barriers as for the purpose of removing copper or other metal deposits for easy recovery thereof outside the cell.

As before indicated, the invention is of greater breadth than the very important application of hydrogen reduction of metals and the like, the principles of the same being applicable also to other types of electrochemical cells including those having external electrical circuits such as fuel cells and the like. The following examples illustrate the efficacy of the process of the invention.

EXAMPLE 1

The apparatus shown in FIG. 2, consisting of the gas plenum depicted schematically in FIG. 1, was provided with a circular porous hydrophobic catalytic barrier 1 that was 2.5 inches in diameter. The inner 2 inch diameter area of the barrier 1 was contacted by the electrolyte 5 and the outer ¼ inch edge or rim of the circle 1' penetrated into the gas plenum. The barrier 1 was prepared by the following procedure.

A platinum-on-carbon sample was prepared substantially in accordance with Example 1, col. 9 of said U.S. Pat. No. 4,044,193, pH being adjusted to 3 during preparation. The air-dried material, containing 9.9% by weight of platinum on Vulcan XC-72 carbon, which carbon has a high surface area of approximately 200 $m^2/g$ was compounded with 50% by weight of wetproofing fluorinated hydrocarbon, herein referred to as Teflon, whereby a typical catalytic carbon-Teflon mixture was formed. In this example, 1.0 gram of platinum-on-Vulcan carbon was suspended in 60 ml of distilled water containing 1.4 g/l of lanthanum sulphate. The suspension was ultrasonically dispersed and 11.75 ml of the aqueous colloidal Teflon dispersion described in col. 1 lines 35-44 in U.S. Pat. No. 4,166,143, containing 85 g/l, was added and the stirring was continued for 5 minutes, whereby the Teflon was completely flocced, forming a uniform catalytic carbon-Teflon mixture. The floc-containing liquid suspension was then filtered, leaving, on the filter the mixture in a form of a paste suitable for coating the substrate. The coating procedure consisted in applying the paste to a standard KFB Carbon Cloth (made by the Stackpole Fiber Company), being about 10 mils thick with openings of about 1 mm in diameter, before catalyzation. The paste was spread uniformly on the surface and partially into the open pores of the cloth. The coated fabric was then heated to 340° C. for about 20 minutes. The resulting electrode-type structure had a platinum loading of 0.14 mg/cm² of electrode area, the platinum being in the form of particles predominantly in the 15-25 Å range, and openings ranging in size between about 0.1 mm and about 1 mm.

3.75 liters of a solution 5 containing 75 ppm Pt, as chloroplatinic acid, (other ions such as $Pd^{++}$, $Pb^{++}$ and some $NO_3^-$) and approximately 1 molar in $H^+$ was recirculated through the cell, flowing transversely through the barrier 1 at a flow rate of 3 liters/minute, with a $H_2$ gas flow of 70 cc/minute through the gas plenum at the external edge or rim 1'. The performance of the barrier is shown in Table 1. Note that any hydrogen not directly consumed in the reduction process was easily recovered for re-use.

TABLE 1

| Time | ppm $Pt^{+4}$ in Solution |
|---|---|
| 0 | 75.0 |
| 0.5 Hrs. | 49.4 |
| 3.0 Hrs. | 1.3 |

The platinum deposited on the barrier 1 was compact and tightly adhered to its fibers. It was recoverable either by ignition of the barrier or by dissolution in a very small volume of aqua regia producing a Pt solution of typically, 100 g/l or more.

EXAMPLE 2

The apparatus of FIG. 4 consisting of the gas plenum shown schematically in FIG. 3 was provided with an electrolyte-porous catalytic barrier 1, as described in Example 2 of said co-pending application.

Utilizing such a porous barrier 1, 2¼"×4", with 2"×4" being exposed to electrolyte 5 and ¼"×4" external edge or rim 1' being exposed to $H_2$, 25 liters of electrolyte having substantially the composition described in Example 1, was flowed parallel to both faces of the barrier at a rate of 4 liters per minute and 70 cc/minute of $H_2$ was flowed through the gas plenum at the edge 1'. (Again, H₂ gas not consumed by the barrier was easily recoverable.)

The performance of the barrier is shown in Table 2.

TABLE 2

| Time | ppm Pt in Solution |
|---|---|
| 0 | 75.0 |
| 2.0 Hrs. | 52.4 |
| 6.5 Hrs. | 41.2 |
| 20.0 Hrs. | 15.0 |
| 29.0 Hrs. | 7.8 |
| 52.0 Hrs. | 2.1 |

Platinum metal, after reduction, was finely divided and adhered only loosely to the barrier. A substantial portion of the deposited metal broke off from the barrier during processing and was easily trapped in an appropriate filter, while the major remaining portion was washed easily from the barrier by a stream of water at the completion of the test. This procedure thus allows the reuse of the barrier without the need for either redissolving the metal or limiting the barrier to the one-time use followed by incineration.

Note that in this mode of operation a non-electrolyte porous barrier, as illustrated in Example 1, Col. 5 of U.S. Pat. No. 4,331,520 of common assignee, is equally suitable, producing similar reduction rates.

EXAMPLE 3

The apparatus and electrolyte-porous barrier described in Example 2 above, the barrier being 2¼"×2½" in size and having 2"×2½" exposed to electrolyte and ¼"×2½" external edge exposed to H₂, was used, recirculating 50 liters of electrolyte containing 300 ppm $Cu^{++}$, as sulfate, at a pH of 2.5 in parallel flow on both faces of the barrier 1 at a rate of 2 liters per minute and flowing 70 cc H₂/minute through the gas plenum at the edge 1'. Copper metal was deposited uniformly on both faces of the barrier. When the reservoir was depleted to below 10 ppm $Cu^{++}$, a new tank was inserted and the run continued uninterrupted. Three such tanks were depleted over a continuous period of 408 hours.

The performance of the barrier is shown in Table 3.

TABLE 3

| Time | lbs Cu°/ft² |
|---|---|
| 0 | 0.00 |
| 23 Hrs. | 0.36 |
| 95 Hrs. | 0.80 |
| 144 Hrs. | 1.15 |
| 262 Hrs. | 1.88 |
| 288 Hrs. | 2.17 |
| 312 Hrs. | 2.63 |
| 408 Hrs. | 3.00 |

The copper deposit was granular and adhered only loosely to the barrier. It was easily removed mechanically by gently rubbing with coarse Teflon mesh. 90% of the deposited copper was removed by this means and the barrier reassembled in the apparatus of FIG. 4 and additional plating resumed at the above described typical rate and copper morphology.

EXAMPLE 4

An electrochemical half-cell—an oxygen concentration cell comprising an oxygen cathode and an alkaline electrolyte—was provided with a square catalytic gas electrode assembly having a channel around the four edges of the electrode with the channel external to the electrolyte, while both faces of the electrode were exposed to the electrolyte.

The said electrode assembly was constructed as follows:

A ¼" thick Lucite (i.e. polyacrylate) plate, and a first 3/16" rubber gasket, each 4 3/4" square, had each a cut-out 2"×2" square window centered within the plate and gasket. The plate and first gasket assembly supported a second rubber gasket, 3/16" thick, which functioned to distribute the gas to the edges of the electrode and to confine the electrolyte to the 2"×2" window, which defines the reaction zone of the electrode. To this end cuts in the second rubber gasket provided a gas-flow channel, ⅛" wide and ⅛" deep, around the perimeter of the 2"×2" reaction zone, with gas entry and exit tubes glued into appropriate cuts in the gasket. The electrode itself, 2¼"×2¼" was placed on top of the second gasket covering the 2"×2" window as well as the ⅛" wide gas flow channel. A window frame nickel current collector was placed on top of the electrode and a third rubber gasket with a centered 2"×2" window was then placed on top of the current collector thereby preventing gross gas leakage into the reaction zone and electrolyte flooding into the gas channel.

Gas, here oxygen, migration was thus limited to the plane of the electrode. Its migration rate, for any given electrode, is controlled by the gas pressure and the rate of O₂ consumption in the reaction zone.

A second Lucite plate with an identical 2"×2" window was used to provide the electrolyte chamber. Lucite plates and rubber gaskets were clamped together for good sealing.

A non-electrolyte-porous catalyzed electrode was fabricated on PWB-6 carbon cloth (Stackpole Fibers Company) according to the method outlined in Example 1, Col. 5 of U.S. Pat. No. 4,331,520 of common assignee. The electrode was inserted in the above-described assembly and used as cathode in a caustic half-cell with 4 in² of electrode area exposed on both faces to 23% aqueous sodium hydroxide NaOH electrolyte at 75° C. The anode was a nickel sheet. Nitrogen gas was fed to the gas channel and discharge (i.e. voltage vs. current density) data were taken under applied DC voltages. In this mode, hydrogen gas was evolved at the cathode and oxygen gas at the anode. Next, oxygen gas was fed to the cathode through the gas channel and discharge data were taken again. In this case oxygen was reduced at the cathode and oxygen was evolved at the anode (by oxidation of the hydroxyl ion). The differences in potential of the cathode, as read vs. a Hg/HgO reference electrode (via a Luggin capillary inserted in the cell), when operated N₂ and O₂, respectively, constituted a measure of the the performance of the oxygen cathode in terms of voltage saving, due to the depolarization occuring at the oxygen cathode, as a function of current density.

The performance of the oxygen cathode is shown in Table 4

TABLE 4

| Amp/sq ft (ASF) | Cathode-Reference Voltage, −E N₂ | Cathode-Reference Voltage, −E O₂ |
|---|---|---|
| 10 | 0.78 | 0.00 |
| 50 | 0.83 | 0.05 |
| 100 | 0.88 | 0.09 |
| 150 | 0.92 | 0.13 |
| 200 | 0.97 | 0.17 |
| 250 | 1.02 | 0.22 |

TABLE 4-continued

| Amp/sq ft (ASF) | Cathode-Reference Voltage, —E $N_2$ | Cathode-Reference Voltage, —E $O_2$ |
|---|---|---|
| 300 | 1.07 | 0.28 |
| 350 | 1.12 | 0.33 |

On the basis of these half-cell data, it is apparent that this oxygen cathode assembly in, for example, an ion-exchange membrane chlor-alkali cell, would yield a voltage saving of 0.7–0.8V (plus any extra-overvoltage of a typical steel cathode which it would replace), up to current densities of 350 Amps/sq ft.

Electrolyte-porous electrodes, as described, for instance, in Example 1 of the above-mentioned co-pending application are also suitable here.

In addition to the above-mentioned advantages of feeding gases to an electrode at an edge external to a cell, this gas-supply means permits, in general, much simplified cell construction in, for example, fuel cells, metal electrowinning cells, chlor-alkali cells and metal air batteries and the like, as are referred to in U.S. Pat. No. 4,293,396 of common assignee, in that these cells do then not require internal gas chambers which complicate the construction of the cells and current collection therein.

Further modifications will occur to those skilled in this art and such are considered to fall within the spirit and scope of the invention as defined in the appended claims.

What is claimed is:

1. A process for introducing ionizable reducing and oxidizing gases into an electrochemical cell and the like having an electrolyte, that comprises, introducing a main portion of a catalytic electrode or barrier of gas permeable material into the electrolyte with a rim portion of the material external to the electrolyte in a chamber isolated from the electrolyte, the gas permeable material having a thickness that is small relative to its other dimensions, and flowing said gas in said chamber along said rim portion and then diffusing the gas in said gas permeable material from the rim portion to the main portion along paths that are perpendicular to the thickness of the material.

2. A process for introducing hydrogen into an electrochemical cell having an electrolyte, that comprises, introducing a main portion of a catalytic electrode or barrier of gas permeable material into the electrolyte with a rim portion of the material external to the electrolyte in a chamber isolated from the electrolyte, the gas permeable material having a thickness that is small relative to its other dimensions, and flowing hydrogen gas in said chamber along said rim portion and then diffusing the gas in said material from the rim portion to the main portion along paths that are perpendicular to the thickness of the material.

3. A process for introducing gaseous oxidant into an electrochemical cell having an electrolyte, that comprises, introducing a main portion of a catalytic electrode or barrier of gas permeable material into the electrolyte with a rim portion of the material external to the electrolyte in a chamber isolated from the electrolyte, the gas permeable material having a thickness that is small relative to its other dimensions, and flowing gaseous oxidant in said chamber along said rim portion and then diffusing the gaseous oxidant in said material from the rim portion to the main portion along paths that are perpendicular to the thickness of the material.

4. A process as claimed in claim 2 in which a catalytic barrier is employed and the electrolyte is a metal ion aqueous electrolyte solution, and in which the hydrogen gas induces hydrogen reduction and deposition of the metal upon said barrier.

5. A process as claimed in claim 4 and in which the cell operates without an external electrical circuit.

6. In electrochemical cell apparatus and the like including an electrolyte and operating with a gas-reducing or oxidizing catalytic electrode or barrier of gas permeable material having a thickness that is small relative to its other dimensions, means for disposing a main portion of said material within said electrolyte and a rim portion of said material external to the electrolyte in a chamber isolated from the electrolyte, and means for flowing gas in said chamber along said rim portion and diffusing the gas in said material from the rim portion to the main portion along paths that are perpendicular to the thickness of the material.

7. Apparatus as claimed in claim 6 and in which the last-mentioned means comprises means for supplying hydrogen.

8. Apparatus as claimed in claim 6 and in which the last-mentioned means comprises means for supplying oxygen or air.

9. Apparatus as claimed in claim 7 and in which said electrolyte comprises metal ion aqueous electrolyte solution and said gas permeable material constitutes a hydrogen-gas-catalytic barrier, with the hydrogen flowing along said rim portion inducing hydrogen reduction and deposition of the metal upon said barrier.

10. Apparatus as claimed in claim 9 and in which said electrolyte is an aqueous copper solution.

11. Apparatus as claimed in claim 9 and in which said electrolyte is an aqueous noble metal ion solution.

* * * * *